US008932061B2

(12) United States Patent
Abernethy, Jr. et al.

(10) Patent No.: US 8,932,061 B2
(45) Date of Patent: Jan. 13, 2015

(54) FACILITATING TACTILE IDENTIFICATION OF A DOCUMENT ATTRIBUTE

(75) Inventors: Michael Negley Abernethy, Jr., Pflugerville, TX (US); Bryan Eric Aupperle, Cary, NC (US); Travis M. Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2310 days.

(21) Appl. No.: 11/774,003

(22) Filed: Jul. 6, 2007

(65) Prior Publication Data

US 2009/0011390 A1    Jan. 8, 2009

(51) Int. Cl.
*G09B 21/00* (2006.01)
*G09B 21/04* (2006.01)
*G09B 21/02* (2006.01)

(52) U.S. Cl.
CPC .............. *G09B 21/003* (2013.01); *G09B 21/04* (2013.01); *G09B 21/001* (2013.01); *G09B 21/004* (2013.01); *G09B 21/02* (2013.01); *G09B 21/00* (2013.01); *G09B 21/008* (2013.01); *G09B 21/007* (2013.01)
USPC ............................. 434/113; 434/112; 434/114

(58) Field of Classification Search
CPC ........ G09B 21/00; G09B 21/02; G09B 21/04; G09B 21/001; G09B 21/002; G09B 21/003; G09B 21/004; G09B 21/005
USPC .......................................... 434/114, 110, 113
See application file for complete search history.

(56) References Cited

U.S. PATENT DOCUMENTS

| 2,661,596 | A | * | 12/1953 | Winslow | 60/326 |
| 2,661,825 | A | * | 12/1953 | Winslow | 192/21.5 |
| 2,663,809 | A | * | 12/1953 | Winslow | 310/78 |
| 2,886,151 | A | * | 5/1959 | Winslow | 192/21.5 |
| 3,047,507 | A | * | 7/1962 | Winslow | 252/75 |
| 3,101,081 | A | * | 8/1963 | Tomatis | 600/25 |
| 3,645,204 | A | * | 2/1972 | Gosnell | 430/281.1 |
| 3,668,333 | A | * | 6/1972 | Kamenir | 360/117 |
| 3,740,446 | A | * | 6/1973 | Benson | 434/114 |
| 3,890,645 | A | * | 6/1975 | La Manna et al. | 360/117 |
| 4,146,757 | A | * | 3/1979 | Murad | 381/364 |
| 4,830,902 | A | * | 5/1989 | Plantenga et al. | 428/207 |
| 4,966,628 | A | * | 10/1990 | Amon et al. | 524/555 |
| 5,086,378 | A | * | 2/1992 | Prince | 362/103 |
| 5,222,895 | A | * | 6/1993 | Fricke | 434/113 |
| RE34,389 | E | * | 9/1993 | Amon et al. | 523/161 |
| 5,367,005 | A | * | 11/1994 | Nachfolger | 523/403 |
| 5,496,174 | A | * | 3/1996 | Garner | 434/114 |
| 5,503,436 | A | * | 4/1996 | Alpaugh et al. | 283/71 |

(Continued)

OTHER PUBLICATIONS

Hyland et al. Currency Features for Visually Impaired People. 44/SPIE vol. 2659, 1996 [Retrieved Aug. 15, 2010 from SPIE Digital Library, 0-8194-2033-6/96 <www.spiedl.org>].*

*Primary Examiner* — Nikolai A Gishnock
(74) *Attorney, Agent, or Firm* — Yee & Associates, P.C.; Parashos T. Kalaitzis

(57) ABSTRACT

The illustrative embodiments described herein provide an apparatus and method for facilitating tactile identification of a document attribute. In one embodiment, the apparatus includes a document. The document has a set of document attributes. The apparatus also includes a fluid incorporated within the document at a designated location associated with a document attribute in the set of document attributes. The fluid changes rigidity in the presence of an electric field to facilitate tactile identification of the document attribute.

19 Claims, 6 Drawing Sheets

(56) References Cited

U.S. PATENT DOCUMENTS

| | | | |
|---|---|---|---|
| 5,531,944 A * | 7/1996 | Frisch | 264/52 |
| 5,569,701 A * | 10/1996 | Moynihan | 524/539 |
| 5,572,431 A * | 11/1996 | Brown et al. | 700/95 |
| 5,658,964 A * | 8/1997 | Amon et al. | 522/31 |
| 5,660,919 A * | 8/1997 | Vallee et al. | 428/206 |
| 5,723,514 A * | 3/1998 | Nachfolger et al. | 523/161 |
| 5,744,223 A * | 4/1998 | Abersfelder et al. | 428/206 |
| 5,830,927 A * | 11/1998 | Vanderhoff et al. | 522/81 |
| 5,904,977 A * | 5/1999 | Reitz | 428/304.4 |
| 6,045,894 A * | 4/2000 | Jonza et al. | 428/212 |
| 6,080,450 A * | 6/2000 | Cantor | 427/517 |
| 6,159,013 A * | 12/2000 | Parienti | 434/114 |
| 6,249,277 B1 * | 6/2001 | Varveris | 345/179 |
| 6,354,839 B1 * | 3/2002 | Schmidt et al. | 434/113 |
| 6,451,231 B1 * | 9/2002 | Harrison et al. | 264/45.3 |
| 6,581,839 B1 * | 6/2003 | Lasch et al. | 235/487 |
| 6,743,021 B2 * | 6/2004 | Prince et al. | 434/113 |
| 6,753,830 B2 * | 6/2004 | Gelbman | 345/55 |
| 6,924,781 B1 * | 8/2005 | Gelbman | 345/85 |
| 7,052,762 B2 * | 5/2006 | Hebrink et al. | 428/212 |
| 7,079,454 B2 * | 7/2006 | Wellen | 368/230 |
| 7,176,895 B2 * | 2/2007 | Harif | 345/169 |
| 7,559,627 B2 * | 7/2009 | Bradley | 347/55 |
| 7,625,632 B2 * | 12/2009 | Argoitia | 428/402 |
| 7,755,744 B1 * | 7/2010 | Leberer | 356/5.1 |
| 2001/0020935 A1 * | 9/2001 | Gelbman | 345/173 |
| 2002/0015836 A1 * | 2/2002 | Jonza et al. | 428/216 |
| 2003/0011573 A1 * | 1/2003 | Villet et al. | 345/169 |
| 2003/0072931 A1 * | 4/2003 | Hebrink et al. | 428/212 |
| 2003/0181835 A1 * | 9/2003 | Klein | 601/72 |
| 2004/0111005 A1 * | 6/2004 | Lu | 600/15 |
| 2005/0150740 A1 * | 7/2005 | Finkenzeller et al. | 194/207 |
| 2005/0200644 A1 * | 9/2005 | Bradley | 347/19 |
| 2006/0099808 A1 * | 5/2006 | Kondo | 434/113 |
| 2006/0118740 A1 * | 6/2006 | Ross et al. | 250/556 |
| 2006/0263539 A1 * | 11/2006 | Argoitia | 427/547 |
| 2007/0104629 A1 * | 5/2007 | Yadav | 423/21.1 |
| 2007/0254268 A1 * | 11/2007 | Adachi et al. | 434/112 |
| 2008/0138267 A1 * | 6/2008 | Yadav | 423/263 |
| 2008/0138774 A1 * | 6/2008 | Ahn et al. | 434/114 |
| 2010/0160016 A1 * | 6/2010 | Shimabukuro et al. | 463/16 |

* cited by examiner

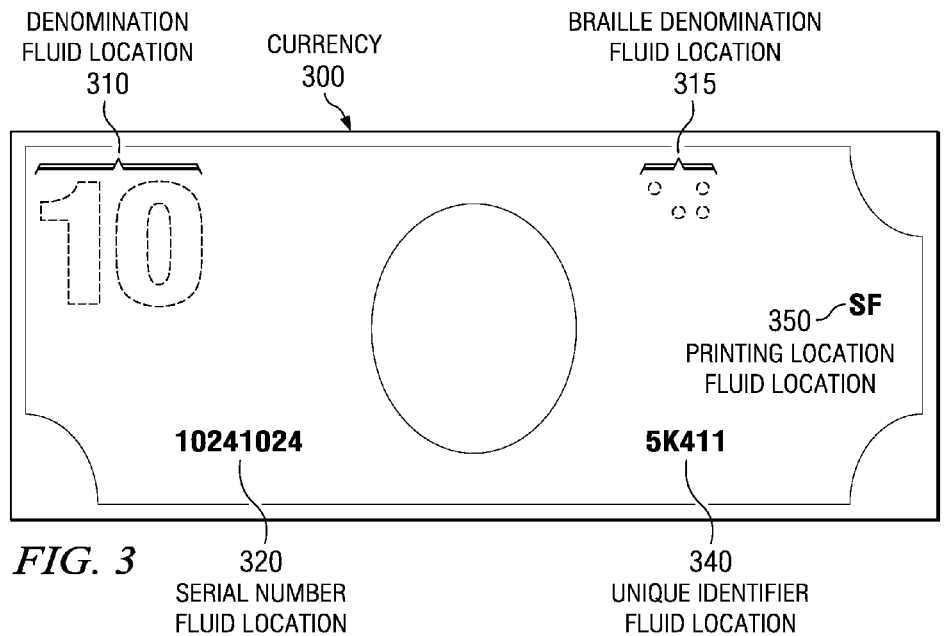
FIG. 3
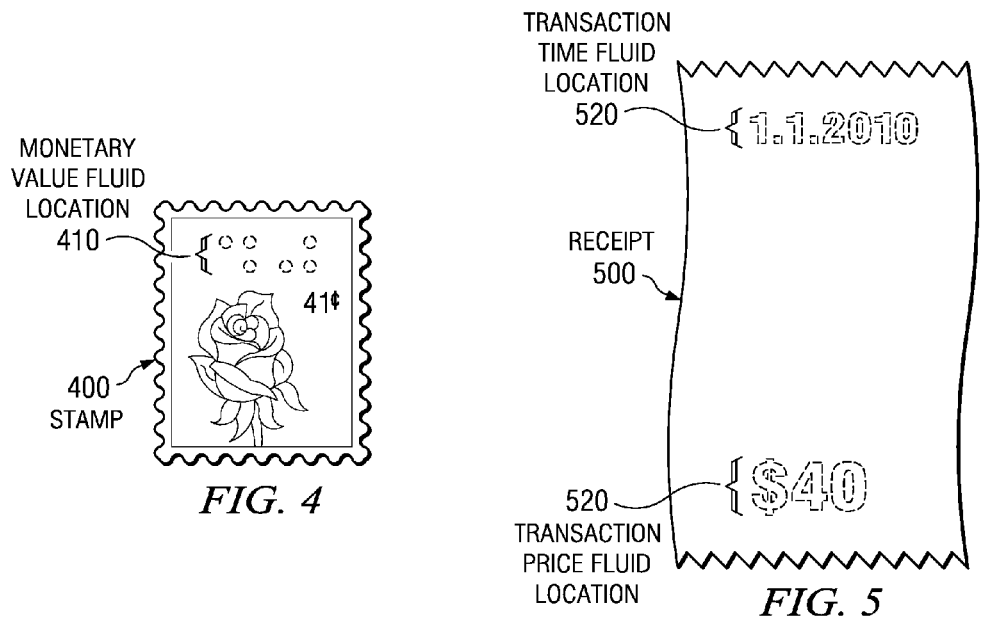
FIG. 4
FIG. 5

FACILITATING TACTILE IDENTIFICATION OF A DOCUMENT ATTRIBUTE

BACKGROUND OF THE INVENTION

1. Field of the Invention

The invention relates generally to a method and apparatus for identifying a document attribute. More particularly, the present invention relates to a method and apparatus for facilitating tactile identification of a document attribute.

2. Description of the Related Art

Many documents include printed writing, shapes, or other forms that allow the document to be visually identified. For example, currency may be identified by the printed numeral or patterns unique to a currency denomination. Similarly, a certificate, stamp, or legal document may be visually identified by the printed writing or patterns contained on those documents.

However, purely visual identification of a document may not be desirable or possible in some situations. For example, visual means for allowing document identification, such as ink lettering, watermarks, and customized document sizes, may be easily reproducible. Thus, a document that relies solely on visual means for identification may be easily counterfeited and used in an illegal manner. For example, a counterfeiter may illegally reproduce a legal document, such as a deed of trust or currency, that is visually indistinguishable from an original and attempt to use the reproduced document in an illegal manner.

In addition, a document that relies only on visual means to be identified fails to provide visually impaired persons with the ability to identify the document. For example, because all currency in the United States has an identical size regardless of denomination, and because United States currency fails to provide non-visual means for identifying a currency denomination, visually impaired persons cannot use their non-visual senses to identify a currency denomination. Similarly, other types of documents, such as stamps, legal documents, checks, receipts and certificates often fail to provide any non-visual means that enable a visually impaired person to identify the document.

One current proposal to provide visually impaired persons with the ability to identify currency is to provide a different paper size for each currency denomination. Thus, a ten-dollar bill may be sized differently than a twenty-dollar bill. Using this method, a visually impaired person may identify a currency denomination by assessing the size of the currency. However, providing a different paper size for each denomination of currency fails to distinguish currency based on other factors, such as serial number, and printing location.

Furthermore, in the United States, devices that relate to currency transactions, such as cash registers, automatic teller machines, bill accepters, and change machines, are all designed for currency of a single size. Thus, resizing currency based on denomination would require the enormous expense of replacing or modifying all such devices that relate to currency transactions to allow for compatibility with currency of different sizes.

The addition of Braille to currency presents a similar problem. Specifically, because devices related to currency transactions are not compatible with currency having raised features, the addition of Braille to currency would require the enormous expense of replacing or modifying such devices.

Another approach used to provide visually impaired persons with the ability to identify currency is to provide currency with enlarged denomination numerals and a unique color based on denomination. However, such measures are not effective for providing assistance to those with total vision loss because they still rely on visual means.

Electronic readers may also be carried and used by visually impaired persons to identify currency. However, many models of such electronic readers are considered slow, unreliable, and expensive.

SUMMARY OF THE INVENTION

The illustrative embodiments described herein provide an apparatus and method for facilitating tactile identification of a document attribute. In one embodiment, the apparatus includes a document. The document has a set of document attributes. The apparatus also includes a fluid incorporated within the document at a designated location associated with a document attribute in the set of document attributes. The fluid changes rigidity in the presence of an electric field to facilitate tactile identification of the document attribute.

In another embodiment, a process inserts a fluid into a document at a designated location associated with a document attribute in a set of documents attributes. The fluid changes rigidity in the presence of an electric field to facilitate tactile identification of the document attribute.

In an alternate embodiment, a process receives a document. The document has a set of document attributes. The process also generates an electric field in a fluid incorporated within the document. The rigidity of the fluid increases at a designated location associated with a document attribute in the set of document attributes. The fluid with increased rigidity is used for tactile identification of the document attribute.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an illustration of a document used to facilitate tactile identification of a document attribute in accordance with an illustrative embodiment;

FIG. 4 is a perspective view of a document used to facilitate tactile identification of a document attribute in accordance with an illustrative embodiment;

FIG. 5 is a perspective view of a document used to facilitate tactile identification of a document attribute in accordance with an illustrative embodiment;

DETAILED DESCRIPTION OF THE PREFERRED EMBODIMENT

Figure 1:
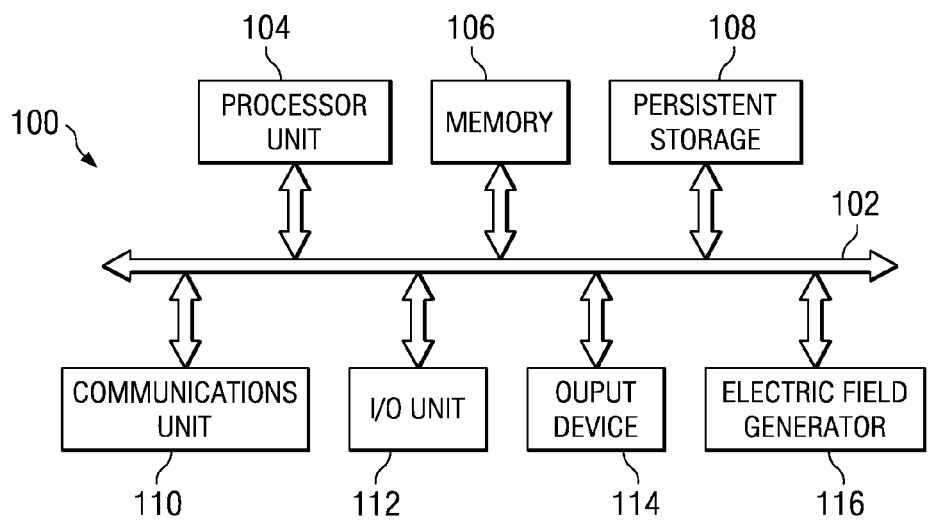
FIG. 1 is a block diagram of a data processing system with which the illustrative embodiments may be implemented.

Turning now to FIG. 1, a block diagram of a data processing system is depicted in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, output device 114, and electric field generator 116.

Processor unit 104 serves to execute instructions for software that may be loaded into memory 106. Processor unit 104 may be a set of one or more processors or may be a multiprocessor core, depending on the particular implementation. Further, processor unit 104 may be implemented using one or more heterogeneous processor systems in which a main processor is present with secondary processors on a single chip. Memory 106, in these examples, may be, for example, a random access memory. Persistent storage 108 may take various forms depending on the particular implementation. For example, persistent storage 108 may be, for example, a hard drive, a flash memory, a rewritable optical disk, a rewritable magnetic tape, or some combination of the above.

Communications unit 110, in these examples, provides for communications with other data processing systems or devices. In these examples, communications unit 110 is a network interface card. I/O unit 112 allows for input and output of data with other devices that may be connected to data processing system 100. For example, I/O unit 112 may provide a connection for user input through a keyboard and mouse. Also, I/O unit 112 may have the ability to receive tactile input. Further, I/O unit 112 may send output to output device 114. Non-limiting examples of output device 114 include a printer, speaker, or movable surface. Output device 114 provides a mechanism to present information to a user.

Electric field generator 116 generates an electric field that may be applied to a document. Although electric field generator 116 is shown as part of data processing system 100, electric field generator 116 may also be separate from data processing system 100.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106.

The illustrative embodiments described herein provide an apparatus and method for facilitating tactile identification of a document attribute. In one embodiment, the apparatus includes a document. The document has a set of document attributes. The apparatus also includes a fluid incorporated within the document at a designated location associated with a document attribute in the set of document attributes. The fluid has an ability to change rigidity in the presence of an electric field to facilitate tactile identification of the document attribute. In an alternate embodiment, the fluid has an ability to increase rigidity to facilitate tactile identification of the document attribute by applying the electric field to the fluid at the designated location.

The fluid may be any fluid that changes rigidity in response to an electric field. For example, the fluid may be an electrorheological fluid. An electrorheological fluid is a suspension of fine electrically active particles in a non-conducting fluid. By applying an electric field to an electrorheological fluid, the viscosity and rigidity of the fluid may be changed reversibly on the order of 100,000, depending on the particular type of electrorheological fluid. The transition of an electrorheological fluid from a liquid to a solid and back may occur on the order of milliseconds, depending on the particular type of electrorheological fluid. Electrorheological fluids may be used in applications such as fast acting hydraulic valves, clutches, brakes, and shock absorbers. Other types of fluids that may be used in the illustrative embodiments are smart fluids such as ferrofluids or magnetorheological fluids.

In the illustrative embodiments, the document having the set of document attributes may be any document having identifiable attributes. The set of document attributes includes one or more document attributes on these examples. Non-limiting examples of the kinds of documents that may be used in conjunction with the illustrative embodiments include currency from any country, stamps, certificates, diplomas, checks, business-related documents, financial documents, and receipts. The document may also be a legal document, such as a contract, deed, mortgage, or document related to a legal proceeding.

In another embodiment, a process inserts a fluid into a document at a designated location associated with a document attribute in a set of documents attributes. The fluid has an ability to change rigidity in the presence of an electric field to facilitate tactile identification of the document attribute.

In an alternate embodiment, a process receives a document. The document has a set of document attributes. The process also generates an electric field in a fluid incorporated within the document. The rigidity of the fluid increases at a designated location associated with a document attribute in the set of document attributes. The fluid with increased rigidity is used for tactile identification of the document attribute.

Figure 2:
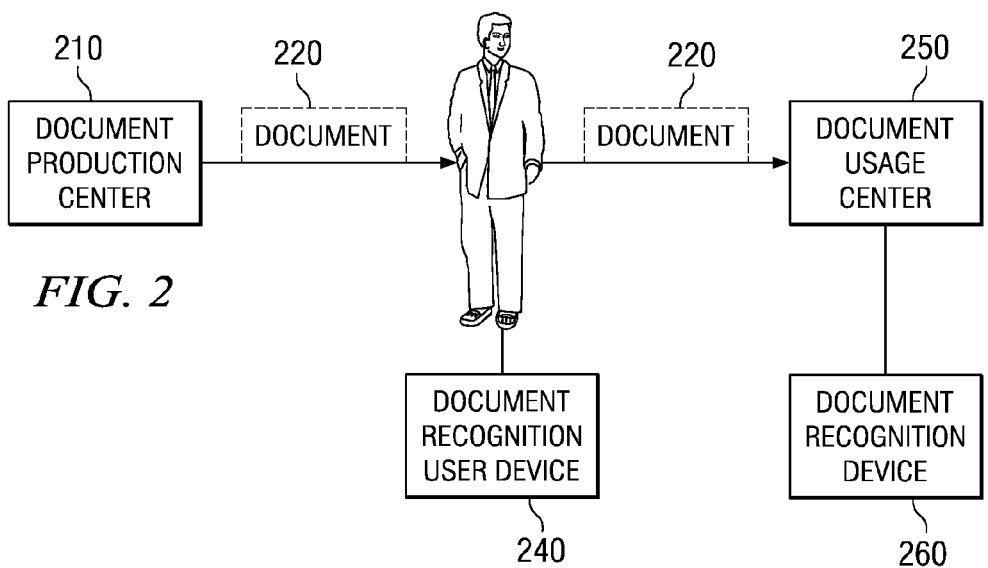
FIG. 2 is a block diagram of a system for facilitating tactile identification of a document attribute in accordance with an illustrative embodiment.

Turning now to FIG. 2, a block diagram of a system for facilitating tactile identification of a document attribute is depicted in accordance with an illustrative embodiment. Specifically, FIG. 2 shows the production, transfer, and usage of a document containing a fluid, such as an electrorheological fluid.

System 200 includes document production center 210. Document production center 210 produces document 220 having a set of document attributes. To produce document 220, document production center 210 inserts a fluid into document 220 at a designated location associated with a document attribute in a set of documents attributes. The fluid has an ability to change rigidity in the presence of an electric field to facilitate tactile identification of the document attribute. For example, the rigidity of the fluid may be increased in the presence of an electric field.

Document production center 210 may be any device, location, or entity that has the ability to insert fluid in a document. For example, document production center 210 may be a printer, a printing press company, a copy machine, a fax machine, or a paper mill. Alternatively, document production center 210 may be a stamp, roller, or injection device that is used to apply fluid to a document. In the case of currency, document production center 210 may be any entity or device with the ability to insert fluid in currency, such as a department of the United States or any device used to produce currency.

The designated location at which the fluid is inserted at document production center 210 may form any combination of letters, numbers, patterns, or forms that are associated with a document attribute. For example, fluid may be inserted onto a check to form numerals that indicate the check number. In the case of currency, the designated location at which the fluid is placed may form one or more numerals, such as 1, 5, 10, or 20, that correspond to a denomination of the currency. Additional examples of fluid placement on currency will be discussed in FIG. 3.

Fluid may be inserted at a designated location to form letters in any language, such as English, Chinese, or Braille. For example, fluid may be inserted onto a receipt to form Braille letters that represent the price, identity, or date of a transaction. As another example, fluid may be inserted onto a document to form a shape that indicates an attribute of the document, such as a diamond on a playing card.

Once the fluid has been inserted into a document to produce document 220, document 220 is then transferred to user 230. User 230 may be any person, entity, or device able to use document 220. For example, user 230 may be a visually impaired person.

User 230 uses document identification user device 240 to facilitate tactile identification of a document attribute of document 220. Document identification user device 240 is any device capable of generating an electric field. Document identification user device 240 may be a data processing system, such as data processing system 100 in FIG. 1. For example, document identification user device 240 may include an electric field generator, such as electric field generator 116 in FIG. 1, which is used to generate an electric field. In this example, document identification user device 240 receives document 220 and generates an electric field to increase the rigidity of the fluid on document 220. The fluid then facilitates tactile identification of a document attribute by allowing user 230 to use tactile perception to identify a document attribute, such as a currency denomination.

Alternatively, document identification user device 240 may include an I/O unit, such as I/O unit 112 in FIG. 1, which receives tactile input by interacting with document 220 and outputs a document attribute of document 220 on an output device, such as output device 114 in FIG. 1. In one embodiment, the document attribute is outputted on a speaker heard by user 230. Further examples of document identification user device 240 will be discussed in detail in conjunction with FIGS. 9-12.

Document identification user device 240 may be a portable or hand-held device that is carried by user 230. Document identification user device 240 may also be stationary or coupled to another device, such as a desk, copy machine, fax machine, scanner, cellular phone, pager, wallet, or other device that is used by user 230.

Document 220 is then transferred to document usage center 250. Document usage center 250 may be any location, device, or entity at which document 220 may be utilized. For example, in the case in which document 220 is a check, currency, or receipt, document usage center 250 may be an automatic teller machine, cash register, checkout counter, bill accepter, change machine, or any location at which a financial transaction takes place. In the example in which document 220 is a stamp, document usage center 250 may be a mailbox, post office, or stamp purchase machine.

Document identification device 260 may be used at document usage center 250 to facilitate tactile identification of a document attribute of document 220. Document identification device 260 is any device capable of generating an electric field that is used in conjunction with document usage center 250. Similar to document identification user device 240, document identification device 260 may be a data processing system, such as data processing system 100 in FIG. 1. For example, document identification device 260 may include an electric field generator, such as electric field generator 116 in FIG. 1, which is used to generate an electric field. In this example, document identification device 260 receives document 220 and generates an electric field to increase the rigidity of the fluid on document 220. The fluid then facilitates tactile identification of a document attribute by allowing user 230 to use tactile perception to identify a document attribute, such as a currency denomination.

Alternatively, document identification device 260 may include an I/O unit, such as I/O unit 112 in FIG. 1, which receives tactile input by interacting with document 220 and outputs a document attribute of document 220 on an output device, such as output device 114 in FIG. 1. In one embodiment, the document attribute is indicated by output on a speaker heard by user 230. Further examples of document identification device 260 will be discussed in detail in conjunction with FIGS. 9-12.

Document identification device 260 may be mounted onto a device in document usage center 250. For example, document identification device 260 may take the form of a document accepter into which document 220 is inserted. The document accepter may then output the document attribute to user 230 or document usage center 250. In an example in which document 220 is currency, document identification device 260 may also be coupled to any device related to a financial transaction, such as a cash register, automatic teller machine, bill accepter, or change maker. In an example in which document 220 is a stamp, document identification device 260 may be coupled to a mailstop or stamp machine.

Turning now to FIG. 3, an illustration of a document used to facilitate tactile identification of a document attribute is depicted in accordance with an illustrative embodiment. Specifically, FIG. 3 shows currency 300, which includes fluid inserted at various locations. Currency 300 is an example of document 220 in FIG. 2. Currency 300 has a set of currency attributes. The set of currency attributes includes at least one attribute of currency 300.

Currency 300 includes fluid at several designated locations, including denomination fluid location 310, serial number fluid location 320, Braille denomination fluid location 315, unique identifier fluid location 340, and printing location fluid location 350. Each of these designated locations is associated with a currency attribute of currency 300. The fluid at each of these locations has an ability to change rigidity in the presence of an electric field to facilitate tactile identification of the currency attribute. For example, the fluid may be an electrorheological fluid that increases rigidity in the presence of an electric field.

Denomination fluid location 310 forms a set of numerals that indicate the monetary value of currency 300. Specifically, denomination fluid location 310 forms the number '10' to indicate that the monetary value of currency 300 is ten dollars. Although denomination fluid location 310 forms a '10' on currency 300, denomination fluid location 310 may form any numeral indicative of a monetary value, such as '1', '5', '20', '50', or '100'.

Braille denomination fluid location 315 forms a set of Braille characters that indicate the monetary value of currency 300. Specifically, Braille denomination fluid location 315 forms the characters '• ..', which represents the number ten. Although Braille denomination fluid location 315 indicates a monetary value of currency 300 using Braille characters, the monetary value of currency 300 may be represented using any character set, such as Arabic, Chinese, or Hindi character sets. Although Braille denomination fluid location 315 represents a monetary value of ten, Braille denomination fluid location 315 may indicate any monetary value, such as '1', '5', '20', '50', or '100.'

In many countries, including the United States, currency may be identified using a serial number. Serial number fluid location 320 forms a set of numerals that indicate a serial number of currency 300. Specifically, serial number fluid location 320 indicates a serial number of '10241024'. Serial number fluid location 320 may form any set of numerals, letters, or symbols that indicate a serial number of currency 300.

Unique identifier fluid location 340 indicates a unique identifier for currency 300. Unique identifier may be any set of numerals, letters, or symbols that are based on an algorithm. The algorithm may be kept secret from the public to discourage counterfeiting. Also, the algorithm may produce the unique identifier based on any of a combination of factors, including the monetary value, printing location, and serial number of currency 300. In FIG. 3, unique identifier fluid location 340 forms the character set '5K411'.

Printing location fluid location 350 indicates a location at which currency 300 was printed. Specifically, printing location fluid location 350 forms the characters "SF", which indicates that currency 300 was printed in San Francisco. Printing location fluid location 350 may form any set of numerals, letters, or symbols that indicate a printing location of a particular currency. Further, the numerals, letters, and symbols that constitute printing location fluid location 350 may indicate any location at which a particular currency is printed, such as a city, building, or organizational department. An example of a printing location is document production center 210 in FIG. 2.

Denomination fluid location 310 and Braille denomination fluid location 315 both contain characters with dotted outlines to show that the fluid at these locations lie beneath an ink layer. The ink layer conceals the fluid from normal view and helps maintain the formation of fluid at the designated location. The ink layer is discussed in further detail with respect to FIGS. 6 and 7 below.

Turning now to FIG. 4, a perspective view of a document used to facilitate tactile identification of a document attribute is depicted in accordance with an illustrative embodiment. Specifically, FIG. 4 shows stamp 400, which includes fluid inserted at various locations. Stamp 400 is an example of document 220 in FIG. 2. Stamp 400 has a set of document attributes. Monetary value fluid location 410 forms a set of Braille characters that indicate the monetary value of stamp 400. Specifically, monetary value fluid location 410 forms the characters '•: ..', which represents the number forty. Although monetary value fluid location 410 indicates a monetary value of stamp 400 using Braille characters, the monetary value of stamp 400 may be represented using any character set, such as Arabic, Chinese, or Hindi character sets. Also, although monetary value fluid location 410 represents a monetary value of forty, monetary value fluid location 410 may indicate any monetary value that corresponds to the value of stamp 400. Monetary value fluid location 410 may also indicate other document attributes of stamp 400, such as a printing location, serial number, date of printing, or a unique identifier.

Monetary value fluid location 410 contains characters with dotted outlines to show that the fluid at these locations lie beneath an ink layer. The ink layer conceals the fluid from normal view and helps maintain the formation of fluid at the designated location. The ink layer will be discussed in further detail in FIGS. 6 and 7.

Turning now to FIG. 5, a perspective view of a document used to facilitate tactile identification of a document attribute is depicted in accordance with an illustrative embodiment. Specifically, FIG. 5 shows receipt 500, which includes fluid inserted at various locations. Receipt 500 is an example of document 220 in FIG. 2. Receipt 500 has a set of document attributes.

Transaction time fluid location 510 forms a set of characters that indicate a time at which a transaction associated with receipt 500 took place. Specifically, transaction time fluid location 510 forms the date '1.1.2010' to indicate that the transaction associated with the receipt took place on Jan. 1, 2010.

Transaction time fluid location 510 may be any date or time that relates to a time at which a transaction associated with receipt 500 took place. For example, transaction time fluid location 510 may also be '12:00' or '3 pm'. Also, transaction time fluid location 510 may be composed using any character set, including Arabic, Chinese, Hindi, or Braille character sets.

Transaction price fluid location 520 forms a set of characters that indicate a transaction price associated with receipt 500. Specifically, transaction price fluid location 520 indicates a transaction price of '$40'.

Transaction price fluid location 520 may be any price that relates to a transaction price associated with receipt 500. Also, transaction price fluid location 520 may be composed using any character set, including Arabic, Chinese, Hindi, or Braille character sets.

Figure 6:
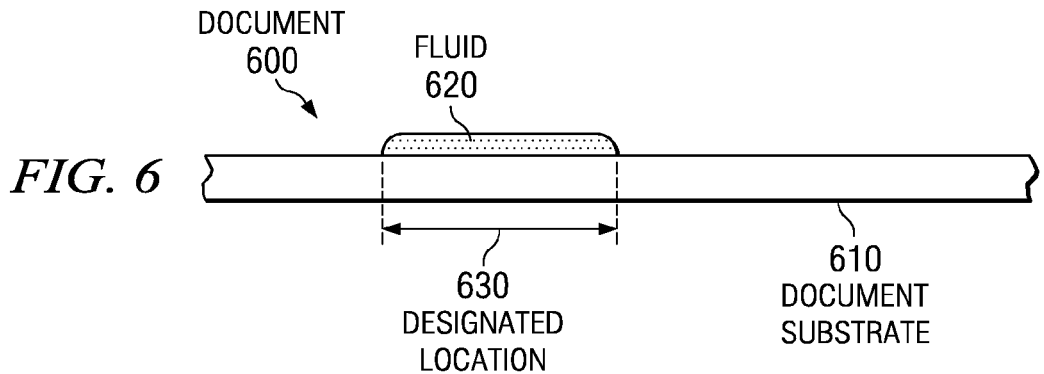
FIG. 6 is a cross-sectional view of a document used to facilitate tactile identification of a document attribute in accordance with an illustrative embodiment.

FIG. 6-9 show non-limiting cross-sectional views of differing configurations of a fluid when applied to a document. Turning now to FIG. 6, a cross-sectional view of a document used to facilitate tactile identification of a document attribute is depicted in accordance with an illustrative embodiment. Non-limiting examples of document 600 include document 220 in FIG. 2, currency 300 in FIG. 3, and stamp 400 in FIG. 4.

Specifically, FIG. 6 shows fluid 620 applied onto document substrate 610 at designated location 630 to form document 600. Document substrate 610 may be any surface onto which fluid 620 may be applied. For example, document substrate 610 may be an adhesive or porous surface to facilitate bonding between document substrate 610 and fluid 620. Specific examples of document substrate 610 include paper, laminate, cardboard, wool, and plastic. Also, fluid 620 may itself have adhesive properties that facilitate bonding between document substrate 610 and fluid 620.

Figure 7:
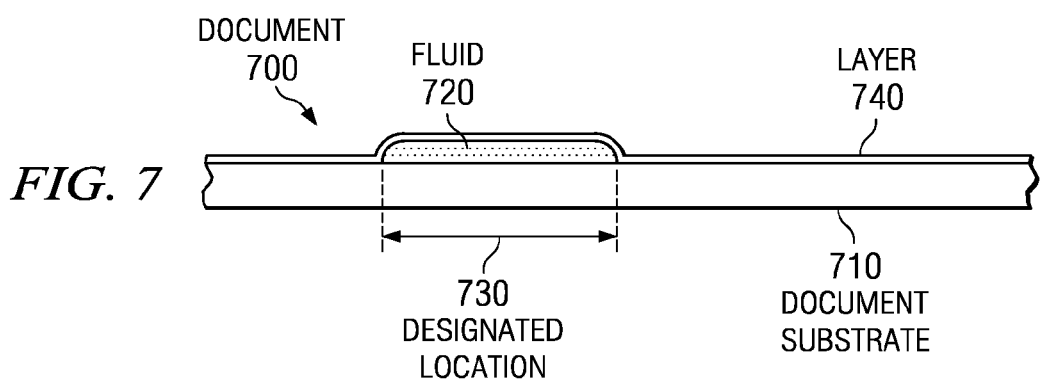
FIG. 7 is a cross-sectional view of a document used to facilitate tactile identification of a document attribute in accordance with an illustrative embodiment.

Turning now to FIG. 7, a cross-sectional view of a document used to facilitate tactile identification of a document attribute is depicted in accordance with an illustrative embodiment. Non-limiting examples of document 700 include document 220 in FIG. 2, currency 300 in FIG. 3, and stamp 400 in FIG. 4.

FIG. 7 shows fluid 720 applied onto document substrate 710 at designated location 730 to form document 700. Like document substrate 610 and fluid 620 in FIG. 6, document substrate 710 and fluid 720 may have adhesive or porous properties that facilitate bonding between document substrate 710 and fluid 720.

Additionally, layer 740 covers document substrate 710 and fluid 720. Layer 740 may serve various purposes, such as concealing document substrate 710 and fluid 720 or holding fluid 720 onto document substrate 710. In one example, layer 740 in an ink layer that has the visual appearance of currency, such as currency 300 of FIG. 3. Layer 740 may also be an ink layer having the visual appearance of any document, such as a stamp, personal check, or a type of certificate.

Layer 740 may be composed of any of a variety of substances that allow a user, such as user 230 in FIG. 2, or a data processing system, such as data processing system 100 in FIG. 1, to perceive a tactile sensation originating from fluid 720 when an electric field is applied at designated location 730. For example, layer 740 may be composed of ink, paint, or dyes.

Figure 8:
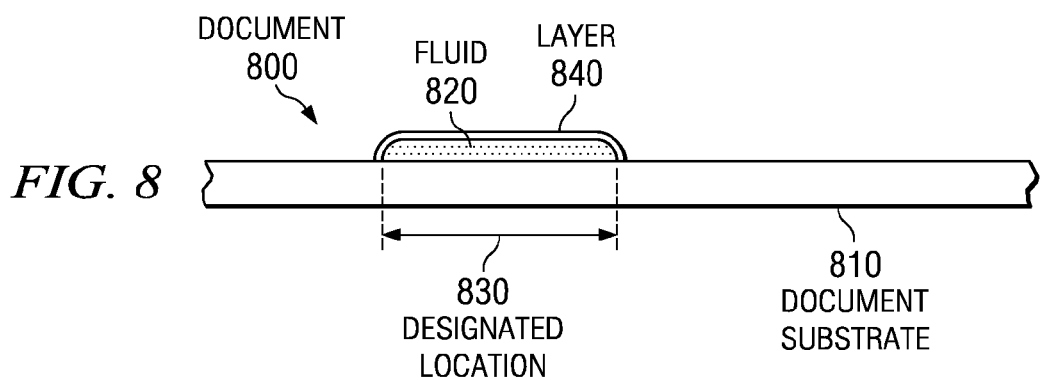
FIG. 8 a cross-sectional view of a document used to facilitate tactile identification of a document attribute in accordance with an illustrative embodiment.

Turning now to FIG. 8, a cross-sectional view of a document used to facilitate tactile identification of a document attribute is depicted in accordance with an illustrative embodiment. Non-limiting examples of document 800 include document 220 in FIG. 2, currency 300 in FIG. 3, and stamp 400 in FIG. 4.

FIG. 8 shows fluid 820 applied onto document substrate 810 at designated location 830 to form document 800. Like document substrate 610 and fluid 620 in FIG. 6, document substrate 810 and fluid 820 may have adhesive properties that facilitate bonding between document substrate 810 and fluid 820.

Additionally, layer 840 covers fluid 820. In contrast to layer 740 in FIG. 7, layer 840 does not cover all of document substrate 810. Like layer 740, layer 840 may serve various purposes, such as concealing document substrate 810 and fluid 820 or holding fluid 820 onto document substrate 810. Layer 840 may be composed of any of a variety of substances that allow a user, such as user 230 in FIG. 2, or a data processing system, such as data processing system 100 in FIG. 1, to perceive a tactile sensation by contacting fluid 820 when an electric field is applied at designated location 830. For example, layer 840 may be composed of ink, paint, or dyes.

Figure 9:
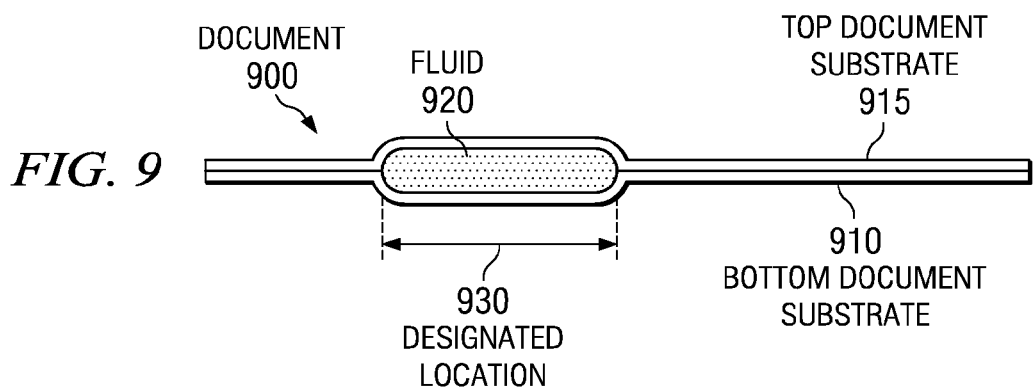
FIG. 9 is a cross-sectional view of a document used to facilitate tactile identification of a document attribute in accordance with an illustrative embodiment.

Turning now to FIG. 9, a cross-sectional view of a document used to facilitate tactile identification of a document attribute is depicted in accordance with an illustrative embodiment. Non-limiting examples of document 900 include document 220 in FIG. 2, currency 300 in FIG. 3, and stamp 400 in FIG. 4.

FIG. 9 shows fluid 920 sandwiched between bottom document substrate 910 and top document substrate 915 at designated location 930. Bottom document substrate 910, top document substrate 915, and fluid 920 may have adhesive or porous properties that facilitate bonding between bottom document substrate 910, top document substrate 915, and fluid 920.

At least one of bottom document substrate 910 and top document substrate 915 may be composed of any of variety of substances that allow a user, such as user 230 in FIG. 2, or a data processing system, such as data processing system 100 in FIG. 1, to perceive a tactile sensation originating from fluid 920 when an electric field is applied at designated location 930. Specific examples of substances that may constitute bottom document substrate 910 or top document substrate 915 include paper, laminate, cardboard, wool, and plastic. Additionally, another layer, such as layer 740 in FIG. 7, may be applied to either bottom document substrate 910 or top document substrate 915.

Figure 10:
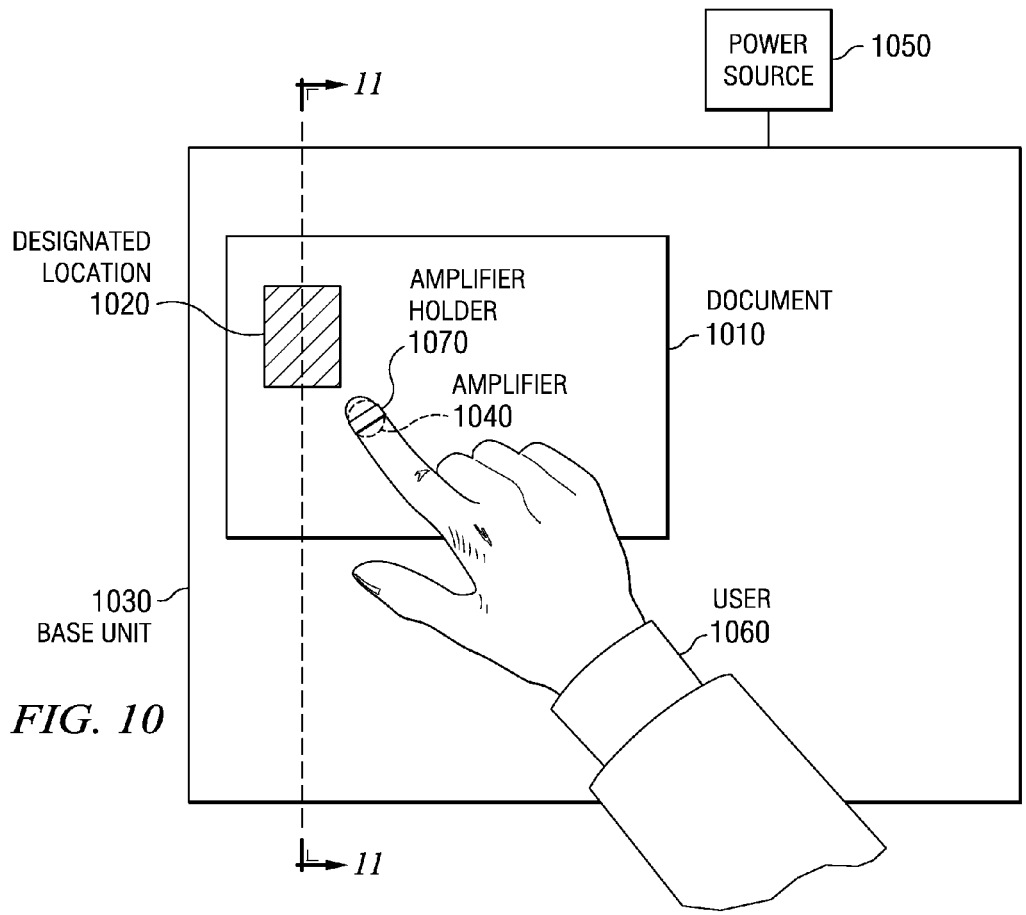
FIG. 10 is a perspective view of a device used to facilitate tactile identification of a document attribute in accordance with an illustrative embodiment.

Turning now to FIG. 10, a perspective view of a device used to facilitate tactile identification of a document attribute is depicted in accordance with an illustrative embodiment. The device shown in FIG. 10, which constitutes base unit 1030, amplifier 1040, and power source 1050 is an example of document identification user device 240 and document identification device 260 in FIG. 2.

The device shown in FIG. 10 receives document 1010, and is capable of generating an electric field to increase rigidity of a fluid incorporated within document 1010 at designated location 1020. The designated location is associated with a document attribute of document 1010. The fluid, which may be an electrorheological fluid, facilitates tactile identification of the document attribute.

FIG. 10 shows document 1010 placed between base unit 1030 and amplifier 1040. Base unit 1030 is flat plate structure that is capable of providing an even surface upon which document 1010 may be placed. Base unit 1030 also serves as one pole for the electric field generated by the cooperation of base unit 1030 and amplifier 1040. Base unit 1030 may be composed of any material that can act as a pole of an electric field, such as copper, gold, graphite, salt solutions, plasma, or any conducting metal. Base unit may have any height, width, or thickness.

The power needed to generate the electric field is supplied by power source 1050. Power source 1050 may be any power source that can provide adequate power to generate an electric field, such as one or more batteries or a power outlet. Although power source 1050 is shown as separate from base unit 1030, power source 1050 may integrated into base unit 1030.

Amplifier 1040 is placed on the tip of the forefinger of user 1060. Amplifier 1040 creates the necessary voltage to generate an electric field in the area between base unit 1030 and amplifier 1040. Amplifier 1040 is a small metallic ring that is able to act as a second pole for the electric field generated by base unit 1030 and amplifier 1040. Amplifier 1040 may be composed of any material that can act as a pole of an electric field, such as copper, gold, graphite, salt solutions, plasma, or any conducting metal. Although amplifier 1040 is shaped as a ring in FIG. 10, amplifier 1040 may be any shape, such as a small circle, square, or a flexible elastic band.

Amplifier 1040 is held onto the index finger of user 1060 by amplifier holder 1070. Amplifier holder 1070 is an elastic band that holds amplifier 1040 against the index finger of user 1060. Although amplifier holder 1070 is shown as an elastic band, amplifier holder 1070 may be any device that harnesses amplifier 1040 relative to user 1060, such as a glove or wristband.

Upon supplying power to base unit 1030 from power source 1050, user 1060 may direct amplifier 1040 to designated location 1020. An electric field is generated in the area between base unit 1030 and amplifier 1040 such that the fluid at designated location 1020 exhibits increased rigidity. User 1060 may then use tactile perception to identify the form created at designated location 1020 such that user 1060 identifies an attribute of document 1010. For example, in the case in which document 1010 is currency, user 1060 may use tactile perception to identify a form, such as a number, that corresponds to the monetary value of the currency.

Figure 11:
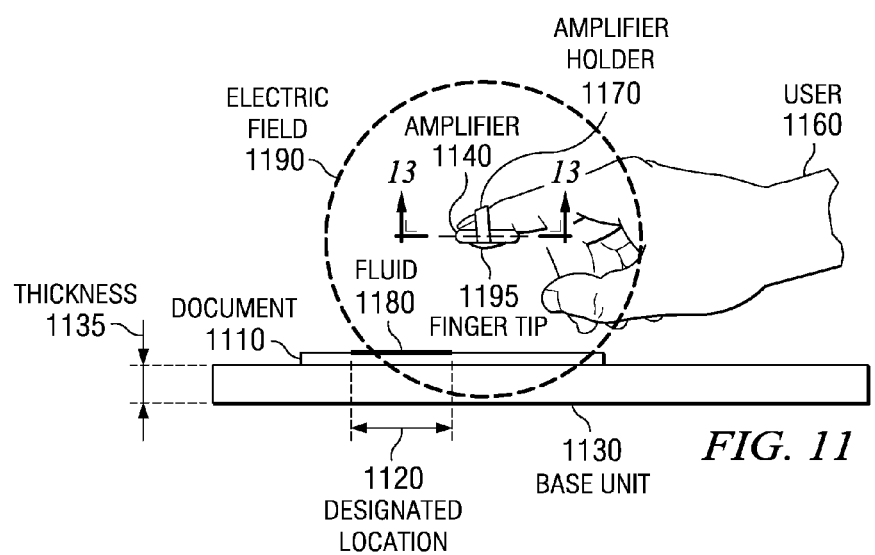
FIG. 11 is a perspective view of a device used to facilitate tactile identification of a document attribute in accordance with an illustrative embodiment.

Turning now to FIG. 11, a cross-sectional view of the device shown in FIG. 10 is depicted in accordance with an illustrative embodiment. Specifically, FIG. 11 shows document 1110 sandwiched between base unit 1130 and amplifier 1140. Amplifier 1140 is held to a finger of user 1160 by amplifier holder 1170.

User 1160 directs amplifier 1140 such that fluid 1180 at designated location 1120 is between amplifier 1140 and base unit 1130. Because amplifier 1140 and base unit 1130 each act as poles of an electric field, electric field 1190 is generated in the area where amplifier 1140 and base unit 1130 are proximate. Electric field 1190 causes fluid 1180 to exhibit increased rigidity. User 1160 may then use fingertip 1195 to identify the form created by fluid 1180 at designated location 1120. Using tactile perception, user 1160 may then identify an attribute of document 1110 based on the form of fluid 1180 at designated location 1120.

Base unit 1130 has thickness 1135. Thickness 1135 may be varied depending on a variety of factors. For example, thickness 1135 may be varied to reduce the cost of manufacturing base unit 1130, or to reduce the burden associated with carrying base unit 1130. Thickness 1135 should also be sized so as to enable base unit 1130 to act as an electric pole to generate electric field 1190.

Figure 12:
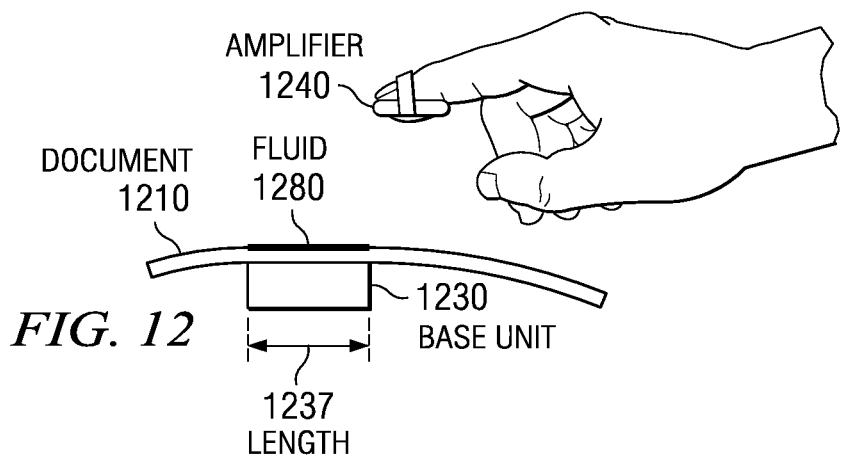
FIG. 12 is a cross-sectional view of a device used to facilitate tactile identification of a document attribute in accordance with an illustrative embodiment.

Turning now to FIG. 12, a cross-sectional view of a device used to facilitate tactile identification of a document attribute is depicted in accordance with an illustrative embodiment. Specifically, document 1210 is shown as sandwiched between amplifier 1240 and base unit 1230. Fluid 1280 is positioned between amplifier 1240 and base unit 1230.

In contrast to FIG. 11, base unit 1230 is shown as having length 1237, such that length 1237 approximately matches the length across fluid 1280. Base unit 1230 may be supplied power by a power source, such as power source 1050 in FIG. 10. Alternatively, base unit 1230 may contain an independent power source, such as one or more batteries.

The smaller size of base unit 1230 as contrasted to base unit 1130 in FIG. 11 helps alleviate the burden associated with carrying base unit 1230. To further alleviate this burden, base unit 1230 may be attached to an article of clothes worn by a user, or may itself be an article of clothes, such as a wristband. Base unit 1230 may also be integrated with a portable user device, such as cellular phone or wallet.

Figure 13:
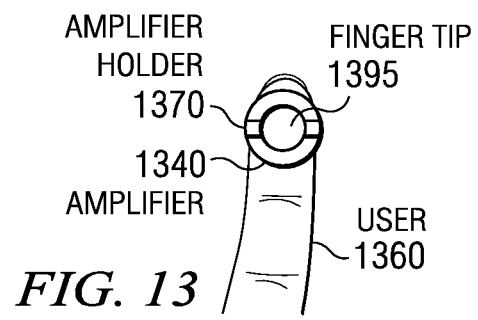
FIG. 13 is a perspective view of an amplifier used to facilitate tactile identification of a document attribute in accordance with an illustrative embodiment.

Turning now to FIG. 13, a perspective view of amplifier 1140 in FIG. 11 is depicted in accordance with an illustrative embodiment. Specifically, amplifier 1340 is shown as a metallic circular ring that is attached to user 1360 by amplifier holder 1370.

Due to the circular ring shape of amplifier 1340, fingertip 1395 of user 1360 is left exposed. Therefore, user 1360 may use fingertip 1395 to perceive any document attributes represented by a fluid, such as fluid 1180 in FIG. 11, when an electric field is applied to the fluid. Amplifier 1340 may also have other shapes that leaves fingertip 1395 exposed, such as a small circle, a square ring, or an elliptical ring.

Figure 14:
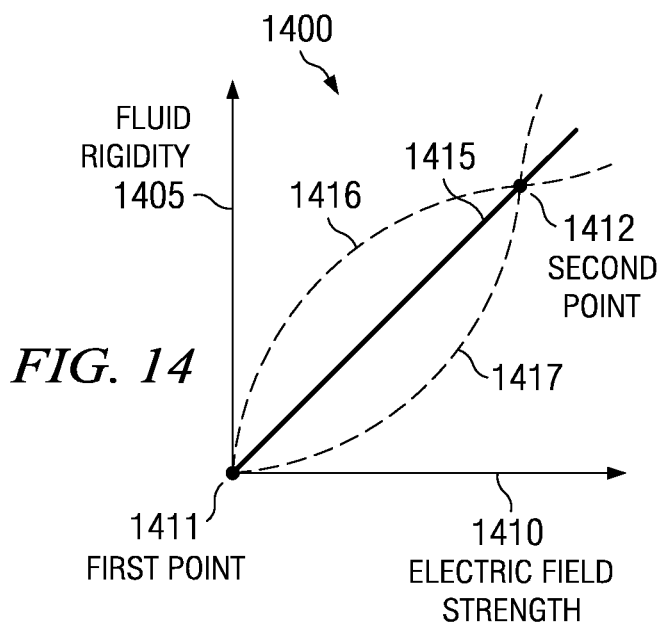
FIG. 14 is a graphical representation of a system for facilitating tactile identification of a document attribute in accordance with an illustrative embodiment.

Turning now to FIG. 14, a graphical representation of a system for facilitating tactile identification of a document attribute is depicted in accordance with an illustrative embodiment. Specifically, graphical representation 1400 is a graph of fluid rigidity 1405 as a function of electric field strength 1410.

Fluid rigidity 1405 is shown as having three possible patterns depending on the type of fluid used. A fluid associated with pattern 1415 exhibits a linear increase in fluid rigidity 1405 as electric field strength 1410 increases. A fluid associated with pattern 1416 exhibits a slower increase in fluid rigidity 1405 as electric field strength 1410 increases. A fluid associated with pattern 1417 exhibits a more rapid increase in fluid rigidity 1405 as electric field strength 1410 increases. Although FIG. 14 depicts fluids having patterns 1415, 1416, and 1417, a fluid may have any pattern, such as an exponential pattern, a stair-step pattern, or logarithmic pattern.

At first point 1411, electric field strength 1410 is zero. Accordingly, the fluid associated with patterns 1415, 1416, and 1417 will exhibit little or no rigidity. At second point 1412, the fluids associated with patterns 1415, 1416, and 1417 experience a higher electric field strength 1410 and therefore exhibit an increased rigidity. At second point 1412, the fluids associated with patterns 1415, 1416, and 1417 may have a gel-like or solid consistency. Hence, at second point 1412, a user may be able to use tactile perception to differentiate the outlines of a form created by the fluids.

Figure 15:
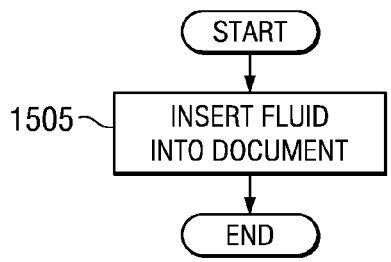
FIG. 15 is a flowchart illustrating a process for facilitating tactile identification of a document attribute in accordance with an illustrative embodiment.

Turning now to FIG. 15, a flowchart illustrating a process for facilitating tactile identification of a document attribute is depicted in accordance with an illustrative embodiment. The process illustrated in FIG. 15 may be implemented by any producer or manufacturer of a document containing a fluid that changes rigidity in the presence of an electric field, such as document 220 in FIG. 2, currency 300 in FIG. 3, and stamp 400 in FIG. 4. For example, the process illustrated in FIG. 15 may be implemented by document production center 210 in FIG. 2.

The process begins by inserting a fluid into a document at a designated location associated with a document attribute in a set of documents attributes (step 1505). The fluid has an ability to change rigidity in the presence of an electric field to facilitate tactile identification of the document attribute. For example, the fluid may be an electrorheological fluid. The process then terminates.

Figure 16:
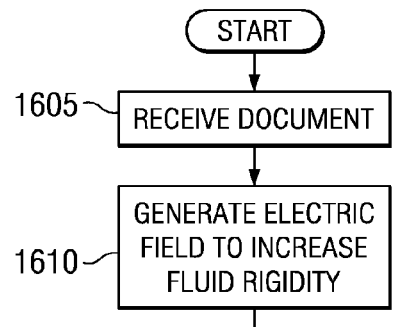
FIG. 16 is a flowchart illustrating a process for facilitating tactile identification of a document attribute in accordance with an illustrative embodiment.

Turning now to FIG. 16, a flowchart illustrating a process for facilitating tactile identification of a document attribute is depicted in accordance with an illustrative embodiment. The process illustrated in FIG. 16 may be implemented by any electric field generator system or unit, such as document identification user device 240 and document identification device 260 in FIG. 2, and base unit 1030 and amplifier 1040 in FIG. 10.

The process begins by receiving a document (step 1605). The document has a set of document attributes. The process generates an electric field to increase rigidity of a fluid incorporated within the document at a designated location associated with a document attribute in a set of documents attributes (step 1610). The fluid facilitates tactile identification of the document attribute. The process then terminates.

Figure 17:
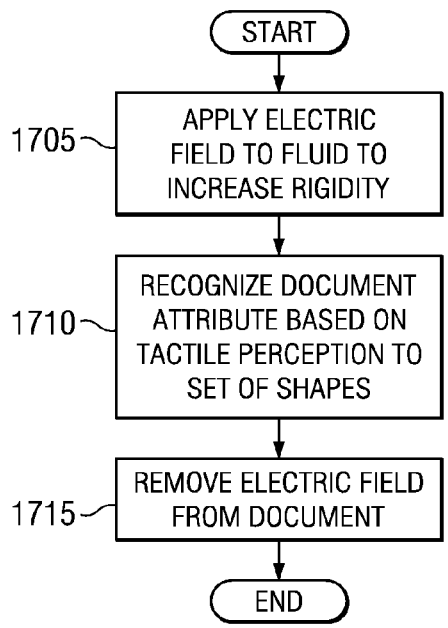
FIG. 17 is a flowchart illustrating a process for facilitating tactile identification of a document attribute in accordance with an illustrative embodiment.

Turning now to FIG. 17, a flowchart illustrating a process for facilitating tactile identification of a document attribute is depicted in accordance with an illustrative embodiment. The process illustrated in FIG. 17 may be implemented by a user, such as user 230 in FIG. 2, or user 1060 in FIG. 10. The process illustrated in FIG. 17 may also be implemented by a data processing system, such as data processing system 100 in FIG. 1.

The process begins by applying an electric field to a fluid in a document to increase rigidity of the fluid (step 1705). The fluid is incorporated within the document at a designated location associated with a document attribute. The process then recognizes the document attribute based on tactile perception of the fluid at the designated location (step 1710). The process then removes the electric field from the fluid to decrease the rigidity of the fluid (step 1715). The process then terminates.

Figure 18:
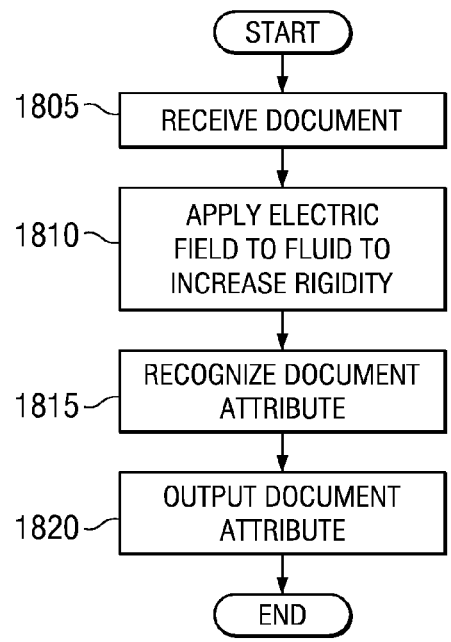
FIG. 18 is a flowchart illustrating a process for facilitating tactile identification of a document attribute in accordance with an illustrative embodiment.

Turning now to FIG. 18, a flowchart illustrating a process for facilitating tactile identification of a document attribute is depicted in accordance with an illustrative embodiment. The process illustrated in FIG. 18 may be implemented by a data processing system, such as data processing system 100 in FIG. 1.

The process begins by receiving a document (step 1805). The process applies an electric field to a fluid in a document to increase rigidity of the fluid (step 1810). The fluid is incorporated within the document at a designated location associated with a document attribute. The process then recognizes the document attribute based on tactile perception of the fluid at the designated location (step 1815). The process then outputs the document attribute on an output device, such as output device 114 in FIG. 1 (step 1820). The process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide an apparatus and method for facilitating tactile identification of a document attribute. In one embodiment, the apparatus includes a document. The document has a set of document attributes. The apparatus also includes a fluid incorporated within the document at a designated location associated with a document attribute in the set of document attributes. The fluid has an ability to change rigidity in the presence of an electric field to facilitate tactile identification of the document attribute. In an alternate embodiment, the fluid has an ability to increase rigidity to facilitate tactile identification of the document attribute by applying the electric field to the fluid at the designated location. The fluid may be an electrorheological fluid.

In another embodiment, a process inserts a fluid into a document at a designated location associated with a document attribute in a set of documents attributes. The fluid has an ability to change rigidity in the presence of an electric field to facilitate tactile identification of the document attribute.

In an alternate embodiment, a process receives a document. The document has a set of document attributes. The process also generates an electric field to increase rigidity of a fluid incorporated within the document at a designated location associated with a document attribute in a set of documents attributes. The fluid facilitates tactile identification of the document attribute.

In one embodiment, document attributes may be identified by visually impaired persons and data processing systems without the need to modify or replace devices that are compatible with uniformly sized United States currency. In another embodiment, the presence of fluid on a document is imperceptible to the human eye or human touch, thereby minimizing any potential incompatibility with existing devices, such as cash registers, automatic teller machines, bill accepters, and change machines.

In another embodiment, power requirements are kept to a minimum by applying an electric field only across a particular fluid location.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for facilitating tactile identification of a document attribute, comprising:
   a document, wherein the document has a set of document attributes;
   an electrorheological fluid incorporated within the document at a designated location associated with a document attribute in the set of document attributes, and wherein the electrorheological fluid changes rigidity in a presence of an electric field to facilitate tactile identification of the document attribute;
   a base unit externally located from the document, wherein the base unit serves a first pole for the electric field; and
   an amplifier externally located from the document, wherein the amplifier serves as a second pole for the electric field.

2. The apparatus of claim 1, wherein the electrorheological fluid increases rigidity to facilitate tactile identification of the document attribute when the electric field is applied to the fluid at the designated location.

3. A method of facilitating tactile identification of a document attribute, comprising:
   inserting an electrorheological fluid into a document at a designated location associated with a document attribute in a set of documents attributes, wherein the fluid changes rigidity in a presence of an electric field to facilitate tactile identification of the document attribute; and
   positioning the document between a base unit and an amplifier, wherein the base unit is externally located from the document, wherein the base unit serves a first pole for the electric field, and wherein the amplifier is externally located from the document, wherein the amplifier serves as a second pole for the electric field.

4. The method of claim 3, wherein the electrorheological fluid increases rigidity in the presence of the electric field to facilitate tactile identification of the document attribute.

5. The method of claim 3, further comprising:
   applying an ink layer over the electrorheological fluid, wherein the ink layer holds the electrorheological fluid within the document.

6. A method of facilitating tactile identification of a document attribute, comprising:
   receiving a document, wherein the document has a set of document attributes; and
   generating an electric field in an electrorheological fluid incorporated within the document, wherein a rigidity of the electrorheological fluid increases at a designated location associated with a document attribute in the set of document attributes and wherein the electrorheological fluid with increased rigidity is used for tactile identification of the document attribute, wherein the electric field is generated between a base unit and an amplifier, wherein the base unit is externally located from the document and serves a first pole for the electric field, and wherein the amplifier is externally located from the document, wherein the amplifier serves as a second pole for the electric field.

7. The method of claim 6, further comprising:
   removing the electric field from the electrorheological fluid to decrease the rigidity of the fluid.

8. The method of claim 6, wherein the electric field is generated by an electric field generator that includes the base unit and the amplifier, and further comprising:
   placing the document between the base unit and the amplifier.

9. An apparatus for facilitating tactile identification of a currency attribute, comprising:
   currency, wherein the currency has a set of currency attributes; and
   an electrorheological fluid incorporated within the currency at a designated location associated with a currency attribute in the set of currency attributes, and wherein the electrorheological fluid changes rigidity in a presence of an electric field to facilitate tactile identification of the currency attribute;
   a base unit externally located from the document, wherein the base unit serves a first pole for the electric field; and
   an amplifier externally located from the document, wherein the amplifier serves as a second pole for the electric field.

10. The apparatus of claim 9, wherein the electrorheological fluid increases rigidity to facilitate tactile identification of the currency attribute when the electric field is applied to the electrorheological fluid at the designated location.

11. The apparatus of claim 9, further comprising:
    an ink layer, wherein the ink layer covers the electrorheological fluid, wherein the ink layer holds the electrorheological fluid within the document.

12. The apparatus of claim 9, wherein the designated location of the electrorheological fluid indicates a monetary value of the currency.

13. The apparatus of claim 9, wherein the designated location of the electrorheological fluid indicates a printing location of the currency.

14. The apparatus of claim 9, wherein the designated location of the electrorheological fluid indicates a serial number of the currency.

15. The apparatus of claim 9, wherein the designated location of the electrorheological fluid indicates a unique identifier of the currency, and wherein the unique identifier is based on at least one of a serial number of the currency, a printing location of the currency, and a monetary value of the currency.

16. The apparatus of claim 1, wherein the amplifier further comprises:
    a metallic ring, wherein the metallic ring is capable of attachment to the finger of a user, and wherein the metallic ring allows the user to tactilely perceive the document attributes from within a center of the metallic ring.

17. The method of claim 3, wherein the amplifier further comprises:
    a metallic ring, wherein the metallic ring is capable of attachment to the finger of a user, and wherein the metallic ring allows the user to tactilely perceive the document attributes from within a center of the metallic ring.

18. The method of claim 6, wherein the amplifier further comprises:
    a metallic ring, wherein the metallic ring is capable of attachment to the finger of a user, and wherein the metallic ring allows the user to tactilely perceive the document attributes from within a center of the metallic ring.

19. The apparatus of claim 9, wherein the amplifier further comprises:
    a metallic ring, wherein the metallic ring is capable of attachment to the finger of a user, and wherein the metallic ring allows the user to tactilely perceive the document attributes from within a center of the metallic ring.

* * * * *